(12) United States Patent
Deshpande et al.

(10) Patent No.: US 10,636,410 B2
(45) Date of Patent: Apr. 28, 2020

(54) ADAPTIVE ACOUSTIC ECHO DELAY ESTIMATION

(71) Applicant: Knowles Electronics, LLC, Itasca, IL (US)

(72) Inventors: Murali Mohan Deshpande, Bengaluru (IN); Sarath Pattathil, Palakkad District (IN)

(73) Assignee: Knowles Electronics, LLC, Itasca, IL (US)

( * ) Notice: Subject to any disclaimer, the term of this patent is extended or adjusted under 35 U.S.C. 154(b) by 4 days.

(21) Appl. No.: 15/993,944

(22) Filed: May 31, 2018

(65) Prior Publication Data
US 2018/0366101 A1 Dec. 20, 2018

Related U.S. Application Data

(60) Provisional application No. 62/520,175, filed on Jun. 15, 2017.

(51) Int. Cl.
| | |
|---|---|
| *G10K 11/178* | (2006.01) |
| *H04M 9/08* | (2006.01) |
| *H04B 3/23* | (2006.01) |

(52) U.S. Cl.
CPC ....... *G10K 11/17854* (2018.01); *H04M 9/082* (2013.01); *H04B 3/23* (2013.01)

(58) Field of Classification Search
CPC ... G10K 11/17854; H04M 9/082; H04B 3/23; H04B 3/237

(Continued)

(56) References Cited

U.S. PATENT DOCUMENTS

| | | |
|---|---|---|
| 8,189,766 B1 | 5/2012 | Klein |
| 8,259,926 B1 | 9/2012 | Avendano et al. |

(Continued)

FOREIGN PATENT DOCUMENTS

| | | |
|---|---|---|
| EP | 2 302 891 A1 | 3/2011 |
| WO | WO-2006/111370 A1 | 10/2006 |

OTHER PUBLICATIONS

Chhetri et al., "Acoustic echo cancelation for high noise environments," 2006 IEEE Int'l Conference on Multimedia and Expo, Toronto, Ontario, Canada, pp. 905-908 (Jul. 9, 2006).

(Continued)

*Primary Examiner* — Paul Kim
*Assistant Examiner* — Douglas J Suthers
(74) *Attorney, Agent, or Firm* — Foley & Lardner LLP

(57) ABSTRACT

A method for acoustic echo cancellation is disclosed herein. A microphone receives a second acoustic signal from a near-end environment, the second acoustic signal including a delayed version of the first acoustic signal from a far-end environment. A processor models a relationship between the first acoustic signal and the second acoustic signal using an adaptive filter. The adaptive filter uses sampling points of the first acoustic signal and the second acoustic signal along a timeline as inputs. The processor identifies a sampling point among the sampling points, wherein weight values of the adaptive filter associated with the identified sampling point experience a significant increase (e.g., 50% increase). The identified sampling point along the timeline represents an estimated delay between the first acoustic signal and the second acoustic signal. The processor further removes the delayed version of the first acoustic signal from the second acoustic signal based on the estimated delay.

20 Claims, 7 Drawing Sheets

(58) Field of Classification Search
USPC .................................................... 381/71.11
See application file for complete search history.

(56) References Cited

U.S. PATENT DOCUMENTS

| | | |
|---|---|---|
| 8,355,511 B2 | 1/2013 | Klein |
| 8,462,936 B2 | 6/2013 | Mason |
| 8,472,616 B1 | 6/2013 | Jiang |
| 9,343,073 B1 | 5/2016 | Murgia et al. |
| 9,584,642 B2 | 2/2017 | Kadiwala et al. |
| 9,916,840 B1 | 3/2018 | Do et al. |
| 9,947,336 B2 | 4/2018 | Shi et al. |
| 9,972,337 B2 | 5/2018 | Li et al. |
| 2017/0208391 A1 | 7/2017 | Shah et al. |

OTHER PUBLICATIONS

International Search Report and Written Opinion, PCT/US2018/035375, Knowles Electronics, LLC, 11 pages (dated Jul. 19, 2018).

ADAPTIVE ACOUSTIC ECHO DELAY ESTIMATION

CROSS-REFERENCE TO RELATED APPLICATIONS

This application claims the benefit of and priority to U.S. Provisional patent application Ser. No. 62/520,175, filed Jun. 15, 2017, the entire contents of which are incorporated herein by reference.

TECHNICAL FIELD

This application relates generally to audio processing and more particularly to adaptive estimation of acoustic echo delay.

BACKGROUND

When using a communication device such as a mobile phone to communicate with a far-end source, echo may develop during the communication. For example, when audio from a far-end environment is output through a speaker of a near-end communication device (e.g., a mobile phone), the far-end audio signal which is output locally by the speaker may be picked up by microphones or other audio sensors of the near-end communication device. As such, the sounds from the far-end audio signal may be sent back to the far-end environment with a delay, resulting in an echo to a far-end listener.

BRIEF DESCRIPTION OF THE DRAWINGS

For a more complete understanding of the disclosure, reference should be made to the following detailed description and accompanying drawings wherein.

DETAILED DESCRIPTION

Figure 1:
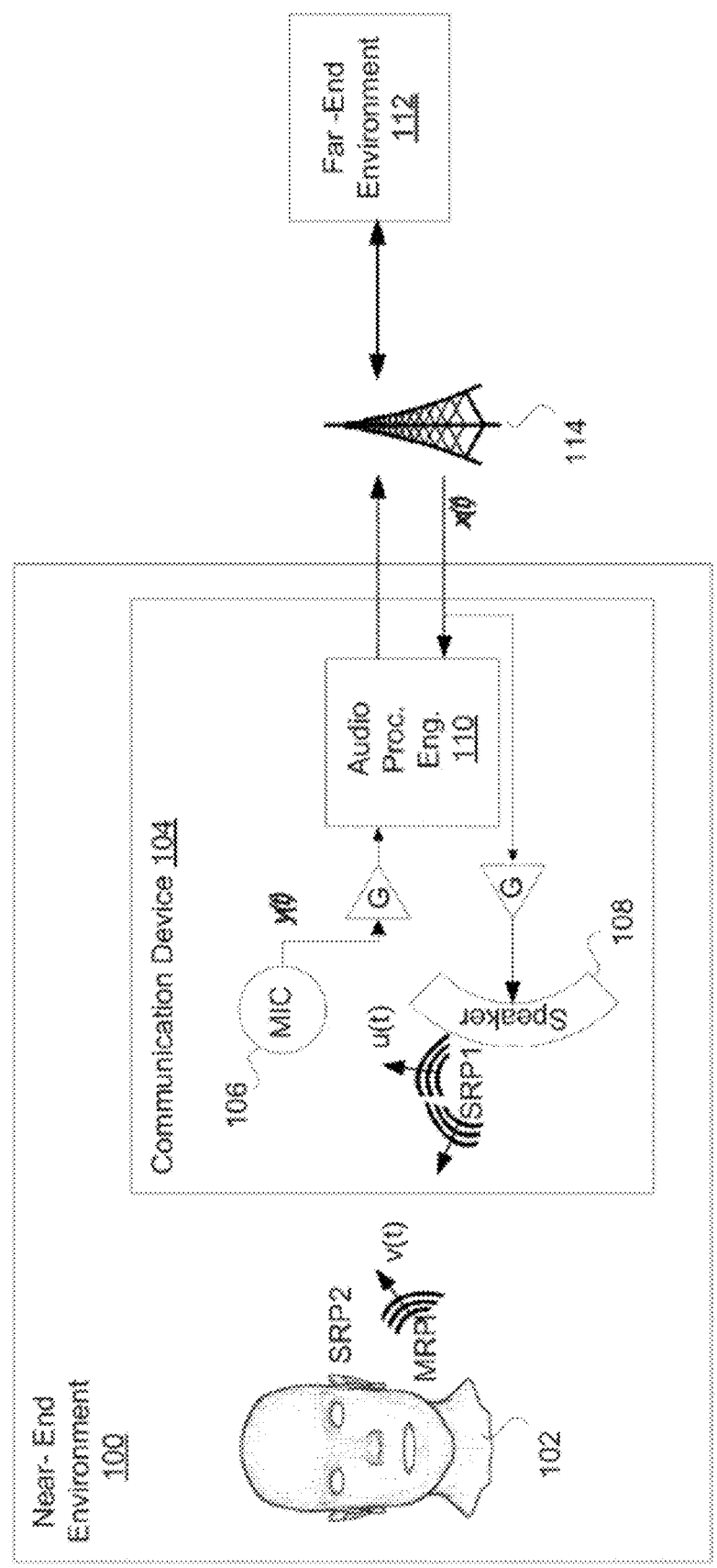
FIG. 1 comprises an environment in which the audio processing system disclosed herein may be used, according to an exemplary embodiment.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

Successful acoustic echo cancellation relies on accurate time delay estimation. An acoustic signal, which is sent from a speaker and then recorded by a microphone, is distorted due to the echo. The distortion is modeled by a room impulse response. In some embodiments, an impulse response is an output of a system (e.g., a room) in response to that system being presented with a brief input signal referred to as an impulse. A room impulse response is an impulse response between, e.g., a loudspeaker and a microphone within an acoustic environment (e.g., a room). The loudspeaker plays a first audio signal, which is an input presented to the system (e.g., the room). The output of the system (e.g., the room) is a second audio signal captured by the microphone. The first and second audio signals may not be the same, because the first audio signal may be reflected, distorted, or absorbed by the acoustic environment (e.g., the room). The loudspeaker and the microphone may be components of a device (e.g., a mobile computing device).

In addition, noise present will be added to the signal recorded on the microphone. The clean signal as well as the delayed and noisy signal being recorded are passed through a system to estimate the room impulse response, which in turn is used for echo cancellation. However, due to the disturbances of echoes and noise, an accurate estimation of the delay is not a trivial task.

Approaches are disclosed herein that improve accuracies of acoustic delay estimation and improve convergence rates of iterative estimation processes. In one aspect of the present disclosure, using the clean signal and the delay signal as inputs, an adaptive filter conducts an iterative process to estimate weight values of the adaptive filter, which correspond to an estimated impulse response. Based on the estimated weight values of the impulse response, a sampling point is selected where there is a significant increase in the filter weight values. The sampling point along the timeline corresponds to an accurate estimation of the delay. In another aspect, a momentum term may be introduced to the weight updating steps of the iterative process to improve the convergence rate of the iterative process of the adaptive filter. In yet another aspect, a time-decaying learning factor may be introduced to the weight updating steps of the iterative process to improve the convergence rate of the iterative process of the adaptive filter.

The disclosed approaches improve the accuracies of the delay estimation and improve the convergence rates. The disclosed approaches also allow estimating the delay in a real time, as the system continues to receive the clean signal and the delayed signal and does not have access to the entire clean signal and the entire delayed signal.

Referring now to FIG. 1, an environment 100 in which various embodiments disclosed herein may be practiced is shown. A user in a near-end environment 100 acts as an acoustic source 102 to a communication device 104 (e.g., a mobile phone).

The exemplary communication device 104 comprises a microphone 106 (i.e., primary microphone), speaker 108, and an audio processing system 110 including an acoustic echo cancellation mechanism. In some embodiments, a mouth of the acoustic source 102 (e.g., the user) is near the microphone 106 and an ear of the acoustic source 102 (e.g., the user) is near the speaker 108. The microphone 106 is configured to pick up audio from the acoustic source 102, but may also pick up noise from the near-end environment 100. The audio received from the acoustic source 102 will comprise a near-end microphone signal y(t), which will be sent back to a far-end environment 112.

In some embodiments, one or more additional microphones (not shown) may be present in the communication device 104. The one or more additional microphones may be located a distance away from the microphone 106. In some embodiments, the microphone(s) may comprise omni-directional microphones.

An acoustic signal x(t) comprising speech from the far-end environment 112 may be received via a communication network 114 by the communication device 104. The received acoustic signal x(t) may then be provided to the near-end environment 100 via the speaker 108. The audio output from the speaker 108 may leak back into (e.g., be picked up by) the microphone 106. This leakage may result in an echo perceived at the far-end environment 112.

The exemplary audio processing system 110 is configured to remove u(t) (which represent echoes of x(t)) from y(t), while preserving a near-end voice signal v(t). In some embodiments, the echoes u(t) include main echoes and residual echoes. The main echoes refer to acoustic signals that are output by the speaker 108 and then immediately picked up by the microphone 106. The residual echoes refer to acoustic signals that are output by the speaker 108, bounced (acoustically reflected) by objects in the near-end environment 100 (e.g., walls), and then picked up by the microphone 106.

In exemplary embodiments, the removal of u(t) is performed without introducing distortion to a far-end listener. This may be achieved by calculating and applying time and frequency varying multiplicative gains or masks that render the acoustic echo inaudible. In some embodiments, the overall signal gain is reduced through the removal of u(t). In other words, the removal of echoes may result in attenuation of the audio signal being sent back to the far-end environment 112. In various embodiments, the attenuation is strong when echo dominates over other components of the signal.

Figure 2:
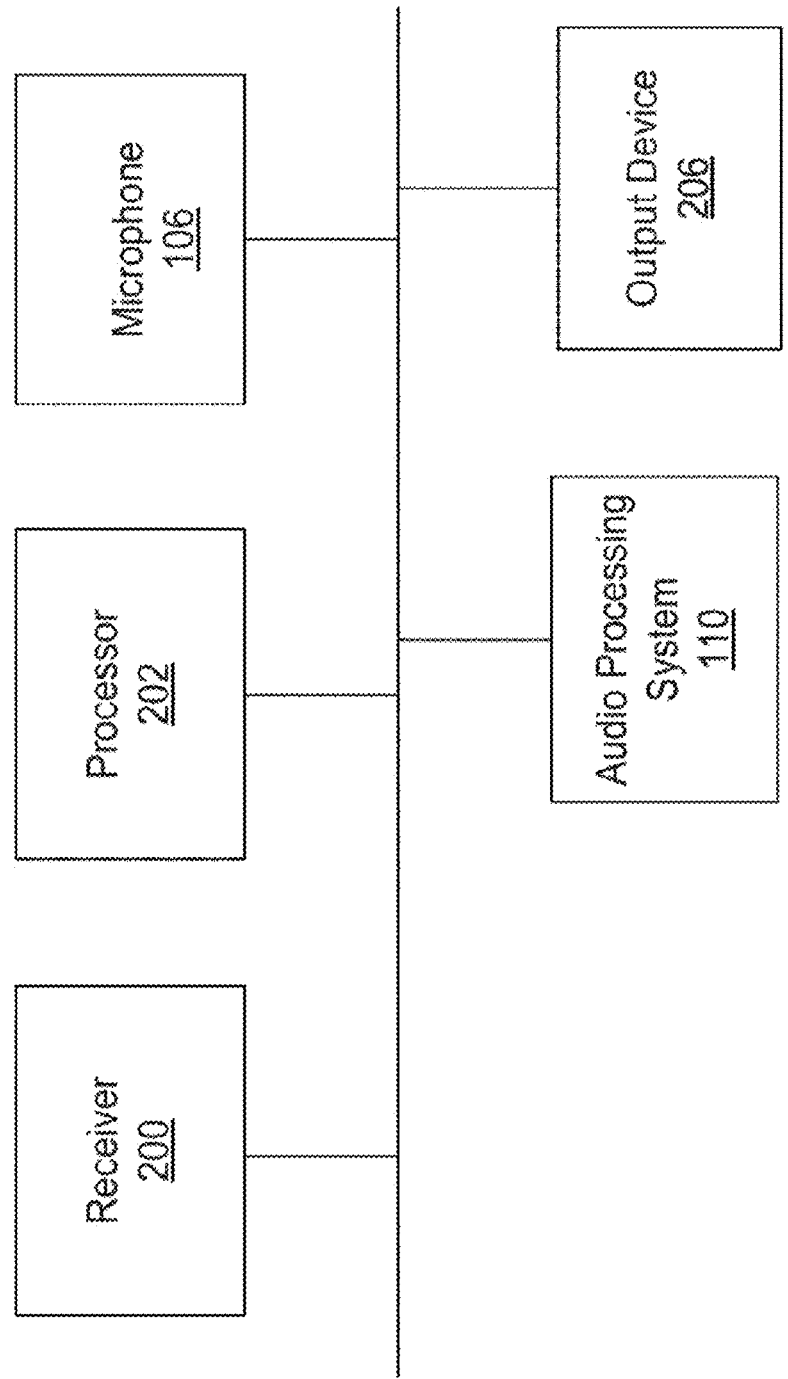
FIG. 2 comprises a block diagram of an audio device including the audio processing system disclosed herein, according to an exemplary embodiment.

Referring now to FIG. 2, the exemplary communication device 104 is shown in further detail. In exemplary embodiments, the communication device 104 is an audio receiving device that comprises a receiver 200, a processor 202, the microphone 106, the audio processing system 110, and an output device 206. The communication device 104 may comprise more or other components necessary for operations of the communication device 104. Similarly, the communication device 104 may comprise fewer components that perform similar or equivalent functions to the components illustrated in FIG. 2.

Processor 202 may include one or more processors that may execute software stored in memory to perform the methods and operations discussed herein. For example, processor 202 can execute software stored in memory to implement the methods performed by audio processing system 110.

The exemplary receiver 200 (e.g., a networking component) is configured to receive the far-end signal x(t) from the network 114. The receiver 200 may be a wireless receiver or a wired receiver. In some embodiments, the receiver 200 may comprise an antenna device. The received far-end signal x(t) may then be forwarded to the audio processing system 110 and the output device 206.

The audio processing engine 110 can receive the acoustic signals from the acoustic source 102 via the microphone 106 (e.g., an acoustic sensor) and process the acoustic signals. After reception by the microphone 106, the acoustic signals may be converted into electric signals. The electric signals may be converted by an analog-to-digital converter (not shown) into digital signals for processing in accordance with some embodiments. It should be noted that embodiments of the present technology may be practiced utilizing any number of microphones.

Output device 206 provides an audio output to a listener (e.g., the acoustic source 102). For example, output device 206 may comprise speaker 108, an earpiece of a headset, or handset on the communication device 104.

Figure 3:
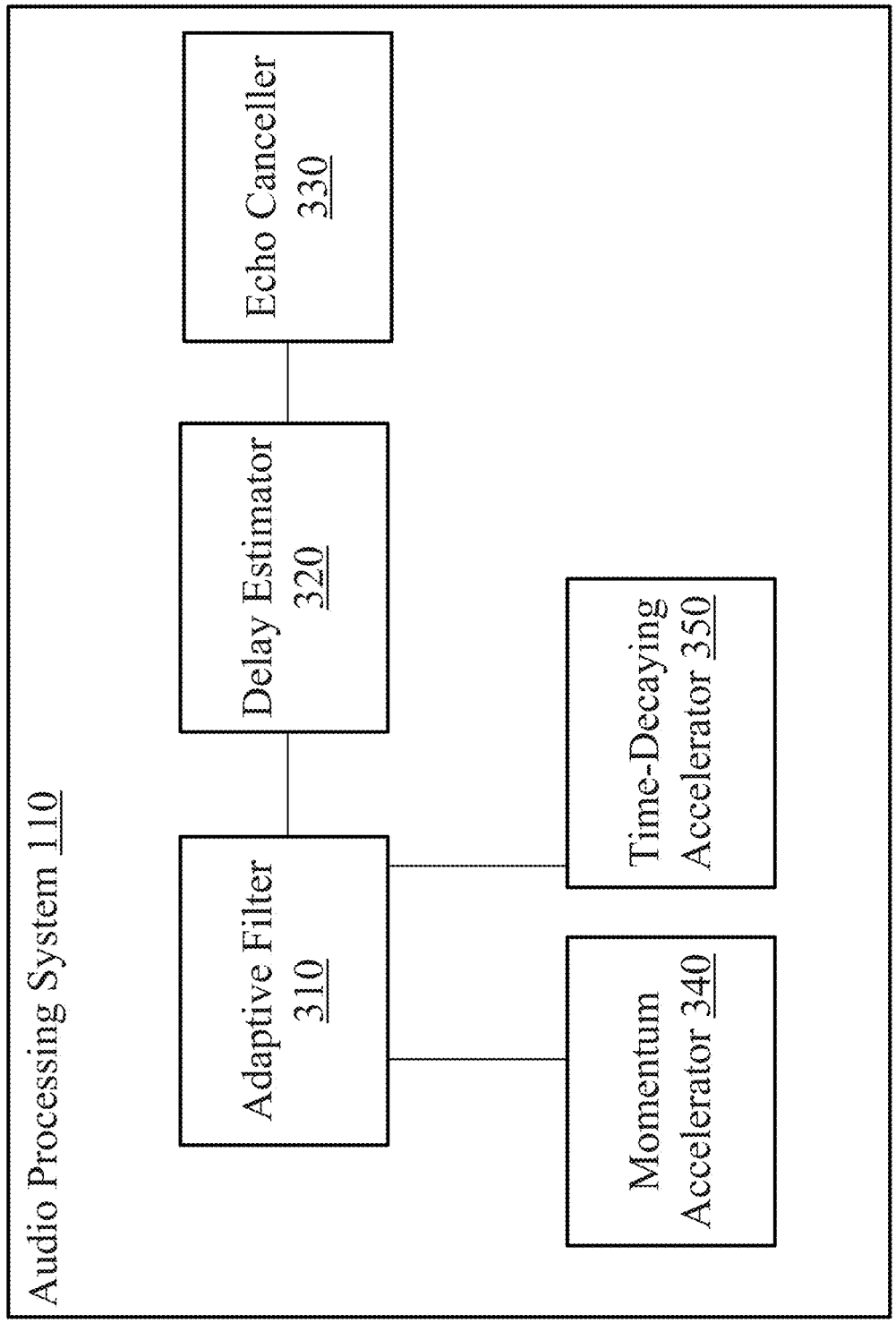
FIG. 3 comprises a block diagram of the audio processing system disclosed herein, according to an exemplary embodiment.

Referring now to FIG. 3, which comprises a detailed block diagram of the exemplary audio processing system 110, according to exemplary embodiments of the present technology. The audio processing engine 110 can be embodied as software that is stored on memory or other electronic storage and can be executed by processor 202. In some embodiments, the audio processing system 110 can be embodied as software and can be executed by one or more processors, which may or may not include the processor 202. For example, the microphone 106 may include one or more processors that can execute some or all of the software of the audio processing engine 110. In some other embodiments, the audio processing system 110 can be embodied as software and can be executed partially by the processor 202, and partially by one or more additional processors separate from the processor 202. Each of the processor 202 and the other processor(s) may be implemented as, or at least include, a digital signal processor (DSP) or an application-specific integrated circuit (ASIC).

The exemplary audio processing system 110 may provide acoustic echo cancellation (AEC) and noise suppression. As a result, an acoustic signal sent from the communication device 104 to the far-end environment 112 comprises noise suppression as well as reduced or eliminated echo from speaker leakage. In accordance with one embodiment, the audio processing system 110 includes an adaptive filter 310, a delay estimator 320, an echo canceller 330, a momentum accelerator 340 and a time-decaying accelerator 350.

It should be noted that the system architecture of the audio processing system 110 of FIG. 3 is exemplary. Alternative embodiments may comprise more components, fewer components, or equivalent components and still be within the scope of embodiments of the present technology.

Iterative Process of Adaptive Filter

In operation, the acoustic signals received from the microphone 106 y(t) and the far-end acoustic signal x(t) are converted to electric signals and processed through an adaptive filter 310. In some embodiments, the adaptive filter 310 may be, e.g., a least mean squares (LMS) filter or a normalized least mean squares (NLMS) filter with modifications. The adaptive filter 310 is configured to estimate the filter weights based on the near-end microphone signal y(t) and far-end acoustic signal x(t).

In exemplary embodiments, the adaptive filter 310 converts the near-end microphone signal y(t) into a delayed signal d(k) (also referred to as noisy signal), wherein index k is the index number of acoustic sampling points along a timeline. The adaptive filter 310 further coverts the far-end acoustic signal x(t) into a clean signal x(k), where $$x(k)=[x(k)x(k-1)\ldots w_N(k-N)]^T.$$

In other words, the clean signal x(k) may be a vector with an order of N. The adaptive filter 310 has an order of N. In other words, a filter weight vector w(k) (also referred to as filter impulse response) includes N vector components, each vector component is a filter weight:

$$w(k)=[w_0(k)w_1(k)\ldots w_N(k)]^T.$$

The adaptive filter 310 uses the delayed signal d(k) and the clean signal x(k) as input, and conducts an iterative process over k to estimate the filter weight vector w(k), which represents an impulse response. The impulse response is a delay version of a room impulse response (with some added noise in some embodiments).

For each itineration for an index number k, the adaptive filter 310 generates an error function e(k):

$$e(k)=d(k)-w^H(k-1)x(k).\qquad \text{Eq. (1)}.$$

Then the adaptive filter 310 generates the next filter weight vector w(k):

$$w(k) = w(k-1) + \frac{\mu}{x^H(k)x(k)+\varepsilon}e^*(k)x(k). \qquad \text{Eq. (2)}.$$

The function e*(k) is a conjugate version of the error function e(k). In some other embodiments, the function e*(k) is the same as the error function e(k). The step size μ (also referred to as learning factor) may be within a range: 0<μ≤1. In some embodiments, the step size μ may change through the iterative steps: μ=μ(k).

In some embodiments, the adaptive filter 310 (e.g., a modified NLMS) normalizes the weight change term by a normalization term, e.g., $x^H(k)x(k)+\varepsilon$. The parameter ε is a non-zero number to prevent the normalization term from being zero.

Delay Estimation After Convergence

The adaptive filter 310 reiterates the process over the sampling point index k until the adaptive filter 310 reaches a convergence. The condition(s) for the convergence may vary. For example, a convergence condition may be that the error function e(k) is less than a threshold value.

Once the adaptive filter 310 reaches a convergence, the delay estimator 320 extracts acoustic delay information from the filter impulse response w(k). The impulse response is a delayed version of a room impulse response. The delay of the room impulse response corresponds to a delay between the clean signal and the delay signal. In some embodiments, the delay estimator 320 extracts the acoustic delay information by finding the location (e.g., represented by an index, which corresponds to a sampling point along the timeline) of the peak value of the estimated filter impulse response w(k): delay=location (maximum (w)). The location, which is the index number of an acoustic sampling point along a timeline, indicates the amount of delay along the timeline.

In some embodiments, the estimation is sufficiently accurate when there is no external noise present or there is negligible amount of external noise. However, in the presence of noise, especially when the signal to noise ratio (SNR) is significantly low, the location of the true maximum of the room impulse response may shift. The shift depends on the specific nature of each room impulse response and can cause inaccuracy in delay estimation. In other words, because the impulse response includes information of noise, the location of the peak value of filter impulse response w(k) may shift from a true value of delay and may cause inaccuracy in the acoustic delay estimation.

In exemplary embodiments, the delay estimator 320 extracts the acoustic delay information by finding a location where the value of the estimated filter impulse response w(k) experiences a significant increase. Such a method of acoustic delay estimation improves the accuracy of the delay estimation. Although the position of maximum of the room impulse response may shift due to external noise, the general location where the weights w start to increase significantly remains the same, regardless whether the delay signal includes external noise or not. Therefore, once the adapter filer 310 generates the filter impulse response w(k) after a convergence, the delay estimator 320 can find a location along a timeline where there is a significant increase in filter weights, instead of a location wherein there is a maximum of filter weights. The location along the timeline is represented by the index number of an acoustic sampling point along the timeline. The timeline location (represented by the index number) indicates the amount of delay along the timeline.

For example, in some embodiments, one way to find the location is by:

$$i := \frac{w(i)}{\max(w(1:i-1))} > \text{threshold}.$$

The notation w(1:i-1) refers to the elements (filter weights) of w from index 1 to index (i-1). The index number i that satisfies the condition represents the timeline location for acoustic echo estimation. In some embodiments, if there are multiple index numbers that satisfy the condition, the index number that occurs first in the timeline will be picked as the representation of the location for acoustic echo estimation. The threshold value for identifying significant increase in filter weights may vary depending on the situations according to various embodiments. The threshold value may be predetermined empirically based on available data. In some embodiments, the threshold value may be, e.g., from 1.2 to 5, from 1.3 to 4, from 1.4 to 3, or from 1.5 to 2.

In some embodiments, the threshold value for identifying the significant increase in filter weights may be determined through a learning algorithm for each communication device (e.g., mobile phone). In some embodiments, the threshold value may be different for various communication devices. During a training process, a set of training data is used for training the learning algorithm to determine the threshold value. For the training data, the delays are known. In some embodiments, the training process starts with a candidate range of threshold values (e.g., from 1 to 5) and a step of, e.g., 0.2. In other words, a group of candidate threshold values (e.g., 20 values) are selected. For each test run of the training process, the delay estimator 320 estimates the delay using the disclosed method with a different candidate threshold value among the group of candidate threshold values. The estimated delays are compared with the known delay of the training data.

The learning algorithm may select the candidate threshold value that predicts the best estimation of the delay (or minimizes the errors of the delay estimations) as the determined threshold value for identifying the significant increase in filter weights in actual delay estimation tasks. In some other embodiments, the learning algorithm may select the candidate threshold value that produces the best signal quality (e.g., best signal-to-noise ratio) as the determined threshold value. In some other embodiments, the learning algorithm may consider both factors of delay estimation and signal quality when determining the threshold value.

To avoid a problem of over-fitting (meaning that the determined threshold value is only suitable for the training data, but is not suitable for estimating delays in real tasks), a set of test data (separate from the set of training data) may be used for verification purpose. In some embodiments, the learning algorithm may use a set of test data with known delays to verify the validity of the determined threshold value. If, however, the delay estimator with the determined threshold value results in large errors between the estimated delays and the known delays of the test data, the learning algorithm may disregard the currently determined threshold value and re-run the training process to select another threshold value.

In some embodiments, the training data and/or the test data for the training purpose may include signals without external noises. In other words, these signals include echoes but does not include extra external noises. Without the external noises, the delays of the echoes may be estimated by methods such as the method based on the maximum value of the filter weights, with accuracies. Thus, these estimated delays may be included in the set of training data and/or the set of test data as the known delays for the training purpose. In some embodiments, additional external noises or distortions may be added to the training data and/or the test data before the training data and/or test data are fed to the delay estimator 320 during the training process.

In some other embodiments, the training data and/or the test data for the training purpose may be produced by artificially adding various echo signals with known delays to a signal without echo signals. Since the delays of the added echo signals are known, the training data can be used by the learning algorithm to pick a threshold value that results in optimal estimations of the delays.

Based on the estimated acoustic delay, the echo canceller 330 may process the near-end microphone signal y(t) to remove the echo. In some embodiments, the echo canceller 330 may generate a mask based on the estimated acoustic delay and the estimated impulse response and apply the mask to the near-end microphone signal y(t) to remove the echo.

Figure 4:
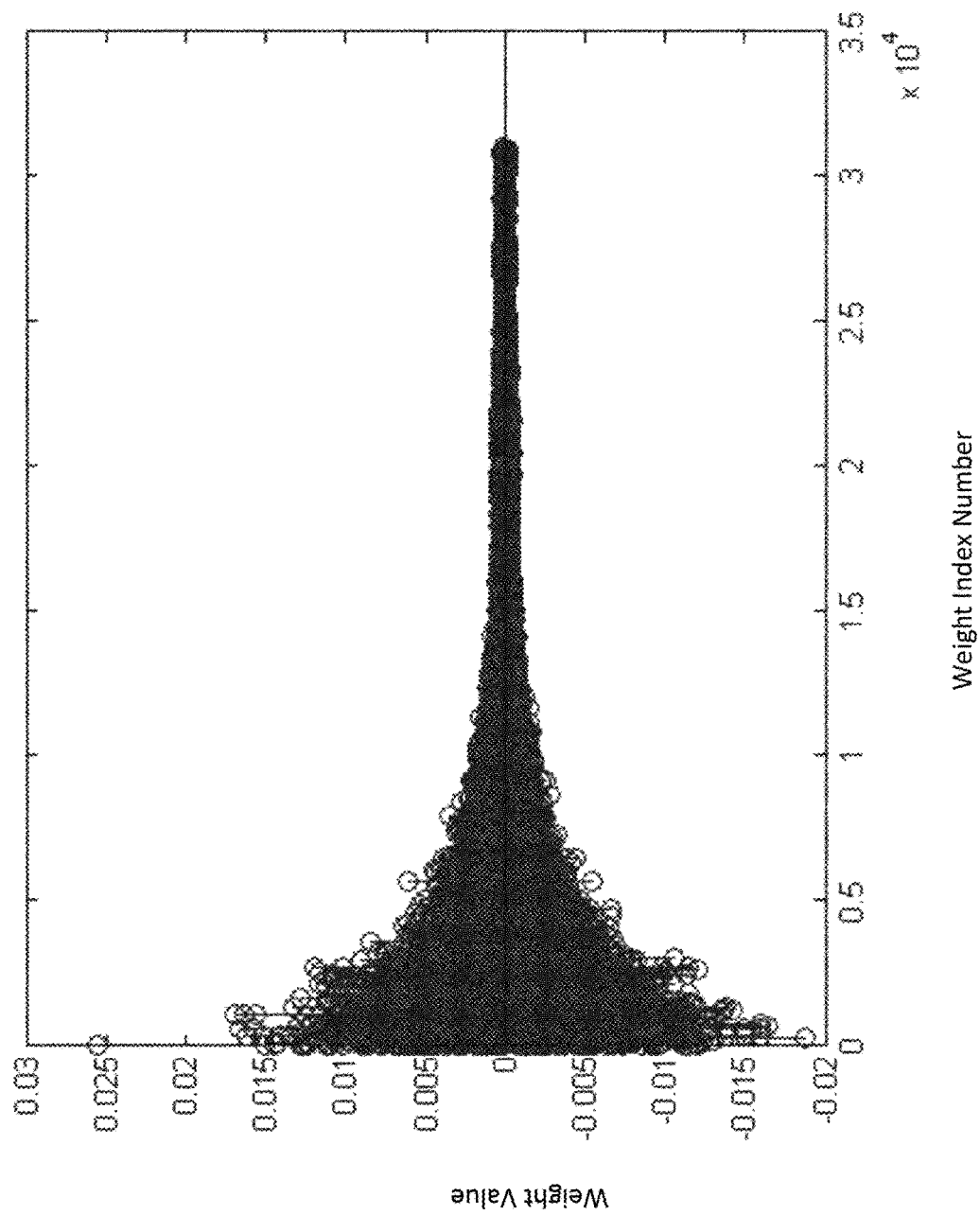
FIG. 4 comprises a diagram of weight values of an exemplary room impulse response, according to an exemplary embodiment.

Referring now to FIG. 4, which comprises a diagram of weights of an exemplary room impulse response, according to exemplary embodiments of the present disclosure. In some embodiments, the room impulse response is modeled by a set of weights. The X-axis of the diagram of FIG. 4 represents index numbers of the weights of the room impulse response. The Y-axis of the diagram of FIG. 4 represents values of the weights. As illustrated in FIG. 4, the room impulse response includes more than 10,000 weights. In some embodiments, it may not be practical or necessary to use an adaptive filter having a size as large as the size of the room impulse response as illustrated in FIG. 4. For example, an acoustic delay may be within a range of delay values, and the size of the adaptive filter may be determined to accommodate a location where the weight value increases significantly. In some embodiments, the adaptive filter examines delays up to 500 acoustic sampling points. Accordingly, the adaptive filter may have a size (also referred to as tap) of, e.g., 512.

Figure 5:
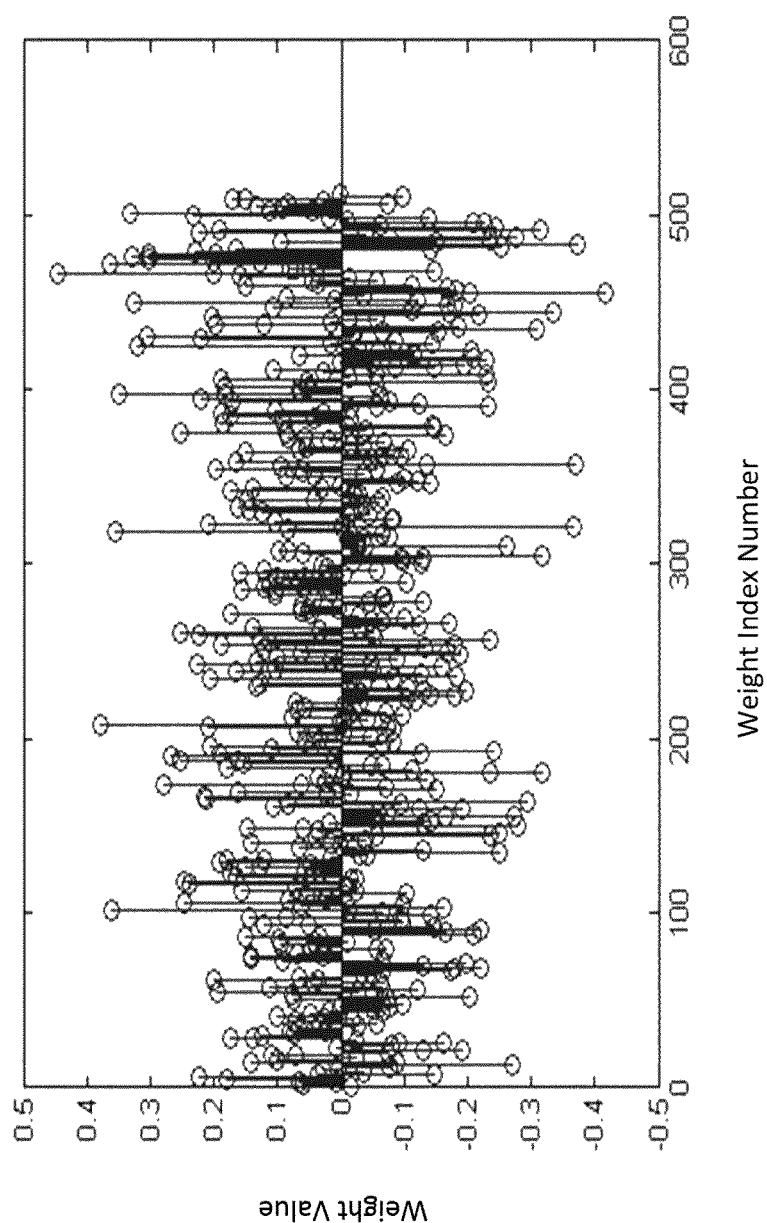
FIG. 5 comprises a diagram of filter weight values of a converged adaptive filter for a sample signal, according to an exemplary embodiment.
Figure 6:
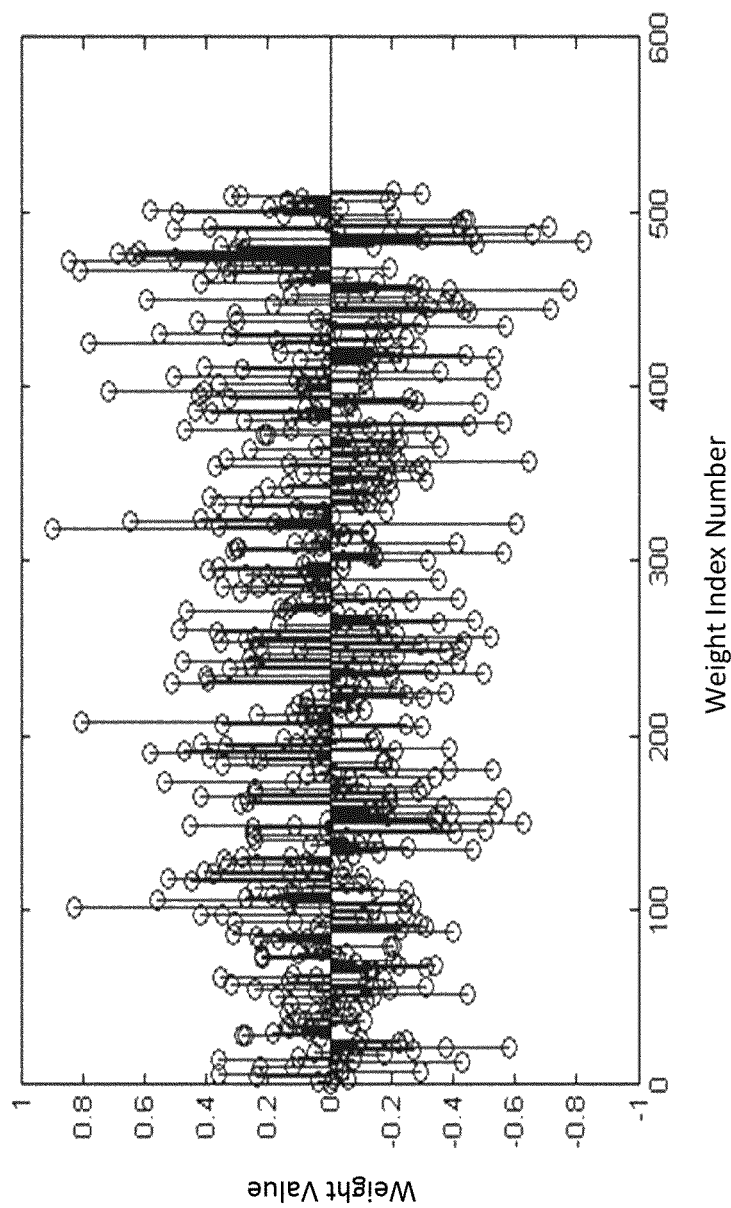
FIG. 6 comprises a diagram of filter weight values of a converged adaptive filter for another sample signal, according to an exemplary embodiment.

Referring now to FIGS. 5 and 6, which show filter weight values of converged adaptive filters for various situations. FIG. 5 illustrates filter weight values of a converged adaptive filter for a babble noise signal. The X-axis of the diagram of FIG. 5 represents index numbers of the filter weights of the converged adaptive filter for the babble noise signal. The Y-axis of the diagram of FIG. 5 represents values of the filter weights. In some embodiments, the delayed version of the babble noise signal has a delay of 100 sample points and has an SNR of 10. FIG. 6 illustrates filter weight values of a converged adaptive filter for a pink noise signal. The X-axis of the diagram of FIG. 6 represents index numbers of the filter weights of the converged adaptive filter for the pink noise signal. The Y-axis of the diagram of FIG. 6 represents values of the filter weights. The delayed version of the pink noise signal has a delay of 100 sample points and has an SNR of 20.

The method of acoustic delay estimation based on a location of a significant increase of weight value may improve the accuracy of delay estimation. Table 1 compares the delays estimated based on locations of maximum (Max.) of filter weights, the delays estimated based on locations of significant increases (Sig.Inc.) of filter weights, and actual delays for different types of signals. The signals include a babble noise signal with an SNR of 10, a babble noise signal with an SNR of 20, a pink noise signal with an SNR of 10, a pink noise signal with an SNR of 20, a voice noise signal with an SNR of 10, and a voice noise signal with an SNR of 20. The delay values are in terms of number of sampling points.

TABLE 1

| Signal Used (Noise/SNR) | Delay (Max.) | Delay (Sig. Inc.) | Actual delay |
|---|---|---|---|
| Babble/10 | 466 | 100 | 100 |
| Babble/20 | 61 | 60 | 60 |
| Pink/10 | 319 | 100 | 100 |
| Pink/20 | 506 | 40 | 40 |
| Voice/10 | 426 | 60 | 60 |
| Voice/20 | 466 | 100 | 100 |

Table 1 shows that the delays estimated based on locations of significant increases (Sig.Inc.) are less than the delays estimated based on locations of maximum (Max.) and are closer to the actual delays. In some embodiments, using appropriate values of thresholds, the method based on locations of significant increases may determine the delay value to be less than (or equal to) the actual delay value between the clean signal and the delayed signal. Therefore, the system of acoustic delay estimation may utilize the delay value to properly remove the echo.

In various embodiments, the rate of convergence for the iterative process of the adaptive filter 310 may depend on the definition of the convergence or condition(s) of the convergence. For example, in some embodiments, the adaptive filter 310 converges if the absolute value of the error function e(k) is less than a convergence threshold value. In some embodiments, the adaptive filter 310 converges if the change of delay value between iterations is less than a convergence threshold value. For example, the convergence threshold value may be 1% of the delay value of the previous iteration. In some other embodiments, other types of convergence condition(s) may be used to determine the convergence. In some embodiments, the convergence condition(s) does not include a condition that an absolute error between the true impulse response and the adapted impulse response is less than a convergence threshold value.

Momentum Term to Improve Convergence

Referring back to FIG. 3, the audio processing system 110 may include additional components to improve the rate of convergence for the adaptive filter 310. Such additional components may include, e.g., a momentum accelerator 340 or a time-decaying accelerator 350.

To expedite the convergence of the iterative process of the adaptive filter 310, the momentum accelerator 340 may introduce a momentum term to the iterative process. In other words, instead of using Eq. (2) to generate the next filter weight vector w(k):

$$w(k) = w(k-1) + \frac{\mu}{x^H(k)x(k)+\varepsilon}e^*(k)x(k), \quad \text{Eq. (2)}.$$

the next filter weight vector may further depend on a momentum term m*Δw(k−1):

$$w(k) = w(k-1) + \frac{\mu}{x^H(k)x(k)+\varepsilon}e*(k)x(k) + m*\Delta w(k-1); \quad \text{Eq. (3)}.$$

where m is a faction coefficient and may vary according to various embodiments, and Δw(k−1) is the weight update of the previous iteration step.

In some embodiments, the momentum term of Eq. (3) adds a fraction of the previous weight update to the current weight update. For example, Δw(k−1)=w(k−1)−w(k−2).

Due to the momentum term, the gradients in the same direction move at a faster pace, while gradients which continuously vary in the direction do not proceed in any fixed direction and hence will not converge unless all successive gradients point in the same or similar directions. In other words, when the gradient keeps pointing in the same direction, the momentum term effectively increases the step size taken towards the minimum and hence helps in faster convergence for the adaptive filter. The added momentum term ensures that spurious data points do not affect the convergence trend of the filter weights.

Table 2 lists exemplary numbers of sampling points before convergence for adaptive filters, with and without momentum terms. In some embodiments, the rate of convergence may be measured by the numbers of sampling points of the input signals needed for the iterative process before a stabilized delay value is achieved. In some embodiments, each sampling point of the input signals has a length of, e.g., 10 milliseconds (ms), which corresponds to 80 samples for a sampling frequency of 8 kHz.

TABLE 2

| Without using momentum term | Using the momentum term |
|---|---|
| 583 | 379 |
| 657 | 523 |
| 329 | 60 |
| 1408 | 1100 |

As shown in Table 2, the momentum term significantly improves the rate of convergence for the iterative process of the adaptive filter.

Time-Decaying Learning Factor to Improve Convergence

Alternatively, to expedite the convergence of the iterative process of the adaptive filter 310, the time-decaying accelerator 350 may introduce a time-decaying learning factor to the iterative process of the adaptive filter. In other words, the time-decaying accelerator 350 modifies the learning factor μ to include a time dependent magnitude. Reducing the learning factor during the iterative process may increase the rate of convergence of the adaptive filter. The time-decaying accelerator 350 may use various methods such as predetermined piecewise constant learning rate, exponentially decaying, power scheduling, time-dependent learning factor, etc.

For example, in some exemplary embodiments, the time-decaying accelerator 350 may introduce a time-dependent variable (e.g., the iteration number) into the learning factor. As the iteration number (iteration#) increases, the learning factor decays:

$$\mu/\text{iteration\#} = w(k-1) + \frac{\mu}{x^H(k)x(k)+\varepsilon+(\text{iteration\#})^2}. \quad \text{Eq. (4)}.$$

Table 3 lists exemplary numbers of sampling points before convergence for adaptive filter with time-decaying learning factors and with constant learning factor. The comparison of Table 3 shows that a time-varying (e.g., time-decaying) learning factor improves the rate of convergence.

TABLE 3

| Constant μ | Time varying μ |
|---|---|
| 583 | 579 |
| 657 | 623 |
| 329 | 310 |
| 1408 | 697 |

In some embodiments, both a momentum term and a time-decaying learning factor may be introduced to improve a convergence rate for an adaptive filter. In some other embodiments, either a momentum term or a time-decaying learning factor may be introduced to improve a convergence rate for an adaptive filter.

Sample Processes of Adaptive Delay Estimation

Figure 7:
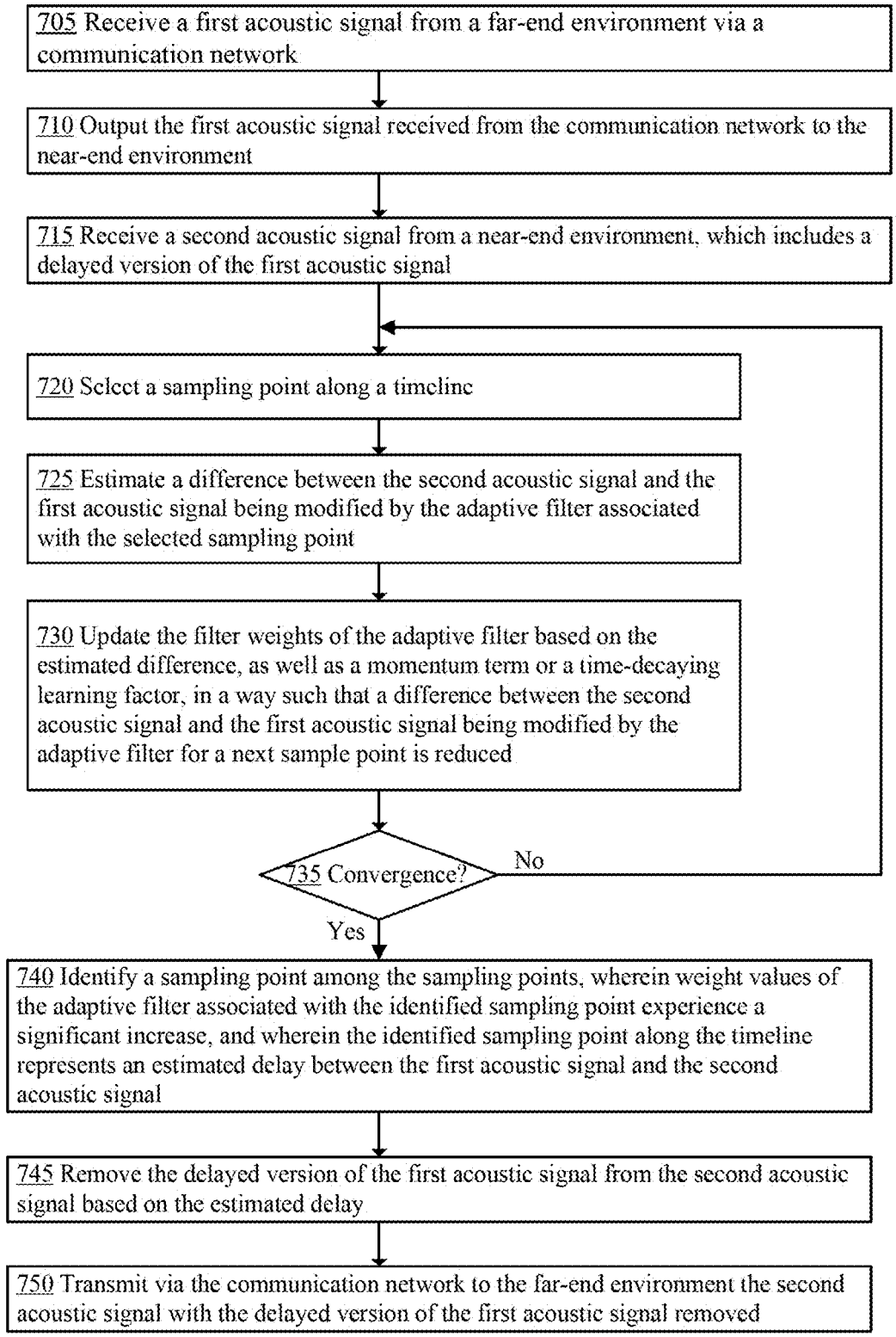
FIG. 7 comprises a flow chart of a method of processing an audio signal, according to an exemplary embodiment.

Referring to FIG. 7, a flow chart of a method of processing an audio signal is shown, according to some exemplary embodiments. In some embodiments, the method conducts an acoustic echo cancellation for the audio signal based on an adaptive delay estimation. At step 705, an audio processing system (e.g., the communication device 104 as illustrated in FIG. 2) receives a first acoustic signal from a far-end environment via a communication network.

At step 710, a speaker of the system outputs the first acoustic signal received from the communication network to the near-end environment. In some embodiments, the first acoustic signal may be reflected by an object in the near-end environment, after being output by the speaker, before being picked up again by a microphone of the system.

At step 715, the microphone of the system receives a second acoustic signal from a near-end environment, which includes a delayed version of the first acoustic signal. In some embodiments, the second acoustic signal may further include an audio generated by an acoustic source (e.g., a speech from a user of the system) of the near-end environment. In some embodiments, the audio may be generated by, e.g., a human, an animal, a machine, or a computer. In some embodiments, the second acoustic signal may further include a noise from the near-end environment.

At step 720, the system selects a sampling point among a plurality of sampling points along a timeline. At step 725, the system estimates a difference between the second acoustic signal and the first acoustic signal being modified by the adaptive filter associated with the selected sampling point. The adaptive filter takes the first acoustic signal and the second acoustic signal as inputs and uses the signals to update filter weights in an iterative process. In some embodiments, the difference may be normalized.

At step 730, the system updates the filter weights of the adaptive filter based on the estimated difference, as well as a momentum term or a time-decaying learning factor, in a way such that a difference between the second acoustic signal and the first acoustic signal being modified by the adaptive filter for a next sample point is reduced. In some embodiments, the momentum term may depend on an update to the filter weights of the adaptive filter during a previous iteration. In some embodiments, the time-decaying learning factor may decay as a number of iterations of the iterative process increases.

At step 735, the system determines whether a convergence condition is met. In some embodiments, the convergence condition may be that the difference between the second acoustic signal and the first acoustic signal being modified by the adaptive filter is less than a convergence threshold value. For example, in some embodiments, the convergence threshold value may be, e.g., 1% of the second acoustic signal, or 1% of the first acoustic signal being modified by the adaptive filter of the previous iteration. If the convergence is not met, the process proceeds to step 720 to select another sampling point and to iterate the steps of 720, 725 and 730. If the convergence is met, the process proceeds to step 740.

At step 740, the system identifies a sampling point among the sampling points, wherein weight values of the adaptive filter associated with the identified sampling point experience a significant increase, and wherein the identified sampling point along the timeline represents an estimated delay between the first acoustic signal and the second acoustic signal. In some embodiments, the condition of the significant increase is satisfied when for each individual sampling point prior to the identified sampling point along the timeline, a ratio of the weight values associated with the identified sampling point to weight values associated with the individual sampling point is higher than a filter threshold value:

$$i := \frac{w(i)}{\max(w(1:i-1))} > \text{threshold}$$

The notation w(1:i−1) refers to the filter weights of w from index 1 to index (i−1). The index number i that satisfies the condition represents the timeline location for acoustic echo estimation. The filter threshold value may be determined empirically. For example, in some embodiments, the threshold value may be, e.g., from 1.2 to 5, from 1.3 to 4, from 1.4 to 3, or from 1.5 to 2.

At step 745, the system removes the delayed version of the first acoustic signal from the second acoustic signal based on the estimated delay. In other words, the echo is cancelled from the second acoustic signal based on the estimated delay. At step 750, the system further transmits via the communication network to the far-end environment the second acoustic signal with the delayed version of the first acoustic signal removed.

As used herein, the singular terms "a," "an," and "the" may include plural referents unless the context clearly dictates otherwise.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A method for acoustic echo cancellation, comprising:
receiving, via a communication network, a first acoustic signal from a far-end environment;
receiving, by a microphone, a second acoustic signal from a near-end environment, the second acoustic signal including a delayed version of the first acoustic signal;
modeling, by a processor, a relationship between the first acoustic signal and the second acoustic signal using an adaptive filter, the adaptive filter using sampling points of the first acoustic signal and the second acoustic signal along a timeline as inputs;
identifying, by the processor, a sampling point among the sampling points, wherein weight values of the adaptive filter associated with the identified sampling point experience an increase above a threshold value and wherein the identified sampling point along the timeline represents an estimated delay between the first acoustic signal and the second acoustic signal; and
removing, by the processor, the delayed version of the first acoustic signal from the second acoustic signal based on the estimated delay.

2. The method of claim 1, wherein the identifying the sampling point comprises:
identifying, by the processor, a sampling point i among the sampling points, wherein $$i := \frac{w(i)}{\max(w(1:i-1))} > \text{threshold},$$

and wherein w(1: i−1) refers to weight values associated with each individual sample point prior to the identified sampling point i along the time line, w(i) refers to weight values associated with the identified sampling point i along the time line, and threshold refers to the threshold value.

3. The method of claim 1, wherein the threshold value is within a range from 1.2 to 5.

4. The method of claim 1, wherein the second acoustic signal further includes an audio generated by an acoustic source of the near-end environment; and
wherein the method further comprises: transmitting, via the communication network, to the far-end environment the second acoustic signal with the delayed version of the first acoustic signal removed.

5. The method of claim 1, wherein the modeling using the adaptive filter comprises:
for a sampling point, estimating a difference between the second acoustic signal and the first acoustic signal being modified by the adaptive filter;
updating filter weights of the adaptive filter based on the estimated difference; and
iterating the estimating and the updating for additional sampling points until a convergence condition is met.

6. The method of claim 5, further comprising:
normalizing the difference between the second acoustic signal and the first acoustic signal being modified by the adaptive filter.

7. The method of claim 5, wherein the updating of the filter weights comprises:
updating filter weights of the adaptive filter based on the estimated difference such that a difference between the second acoustic signal and the first acoustic signal being modified by the adaptive filter for a next sample point is reduced.

8. The method of claim 5, wherein the convergence condition is that the difference between the second acoustic signal and the first acoustic signal being modified by the adaptive filter is less than 1% of the first acoustic signal being modified by the adaptive filter.

9. The method of claim 5, wherein the updating of the filter weights comprises: updating filter weights of the adaptive filter based on the estimated difference and a momentum term, and wherein the momentum term depends on an update to the filter weights of the adaptive filter during a previous iteration.

10. The method of claim 5, wherein the updating of the filter weights comprises: updating filter weights of the adaptive filter based on the estimated difference and a learning factor that varies with time, and wherein the learning factor that varies with time is a time- decaying learning factor that decays as a number of iterations of the estimating and the updating increases.

11. The method of claim 1, further comprising:
outputting, by a speaker, the first acoustic signal received from the communication network to the near-end environment;
wherein the first acoustic signal received from the communication network is reflected by an object in the near-end environment, after being output by the speaker, before being received by the microphone as the delayed version of the first acoustic signal included in the second acoustic signal.

12. The method of claim 1, wherein the second acoustic signal further includes a noise from the near-end environment.

13. A method for acoustic echo cancellation, comprising:
receiving, via a communication network, a first acoustic signal from a far-end environment;
receiving, by a microphone, a second acoustic signal from a near-end environment, the second acoustic signal including a delayed version of the first acoustic signal;
modeling, by a processor, a relationship between the first acoustic signal and the second acoustic signal using an adaptive filter including filter weights, the adaptive filter using sampling points of the first acoustic signal and the second acoustic signal along a timeline to update the filter weights in an iterative process based on a momentum term or a time-decaying learning factor;
identifying, by the processor, a sampling point among the sampling points, wherein weight values of the adaptive filter associated with the identified sampling point experience an increase above a threshold value, and wherein the identified sampling point along the timeline represents an estimated delay between the first acoustic signal and the second acoustic signal; and
removing, by the processor, the delayed version of the first acoustic signal from the second acoustic signal based on the estimated delay.

14. The method of claim 13, wherein the momentum term or the time-decaying learning factor accelerates a convergence of the iterative process of updating the filter weights of the adaptive filter.

15. The method of claim 13, wherein the filter weights of the adaptive filter is updated based on the momentum term that depends on an update to the filter weights of the adaptive filter during a previous iteration.

16. The method of claim 13, wherein the filter weights of the adaptive filter is updated based on the time-decaying learning factor that decays as a number of iterations of the iterative process increases.

17. A system for echo cancellation, comprising:
a networking component configured to receive a first acoustic signal from a far-end environment;
a microphone configured to receive a second acoustic signal from a near-end environment, the second acoustic signal including a delayed version of the first acoustic signal; and
a processor, when in operation, configured to conduct a process including:
modeling a relationship between the first acoustic signal and the second acoustic signal using an adaptive filter, the adaptive filter using sampling points of the first acoustic signal and the second acoustic signal along a timeline to update filter weights of the adaptive filter;
identifying a sampling point among the sampling points, wherein weight values of the adaptive filter associated with the identified sampling point experience an increase above a threshold value, and wherein the identified sampling point along the timeline represents an estimated delay between the first acoustic signal and the second acoustic signal; and removing the delayed version of the first acoustic signal from the second acoustic signal based on the estimated delay.

18. The system of claim 17, further comprising:
a speaker configured to output the first acoustic signal received from the communication network to the near-end environment.

19. The system of claim 17, wherein the networking component is further configured to transmit to the far-end environment the second acoustic signal with the delayed version of the first acoustic signal removed.

20. The system of claim 17, wherein the filter weights are updated in an iterative process based on a momentum term or a time-decaying learning factor, and wherein the momentum term or the time-decaying learning factor accelerates a convergence of the iterative process of updating the filter weights of the adaptive filter.

* * * * *